(12) United States Patent
Langtind et al.

(10) Patent No.: US 10,255,718 B2
(45) Date of Patent: Apr. 9, 2019

(54) GRAPHICS PROCESSING

(71) Applicant: ARM Limited, Cambridge (GB)

(72) Inventors: Frank Langtind, Melhus (NO);
Andreas Due Engh-Halstvedt,
Trondheim (NO); **Sandeep
Kakarlapudi**, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/393,120

(22) Filed: Dec. 28, 2016

(65) Prior Publication Data
US 2017/0193691 A1 Jul. 6, 2017

(30) Foreign Application Priority Data

Jan. 5, 2016 (GB) .................................. 1600144.8

(51) Int. Cl.
| G06T 1/20 | (2006.01) |
| G06T 15/80 | (2011.01) |
| G06T 17/20 | (2006.01) |
| G06F 9/38 | (2018.01) |
| G09G 5/36 | (2006.01) |
| G06T 15/00 | (2011.01) |

(52) U.S. Cl.
CPC ............ *G06T 15/80* (2013.01); *G06F 9/3879* (2013.01); *G06T 1/20* (2013.01); *G06T 15/005* (2013.01); *G06T 17/20* (2013.01); *G09G 5/363* (2013.01)

(58) Field of Classification Search
None
See application file for complete search history.

(56) References Cited

U.S. PATENT DOCUMENTS

| 2007/0146378 A1* | 6/2007 | Sorgard | .................. G06T 15/00 345/581 |
| 2009/0073177 A1* | 3/2009 | Jiao | .......................... G06T 1/60 345/501 |
| 2010/0302246 A1* | 12/2010 | Jiao | .......................... G06T 1/20 345/426 |

FOREIGN PATENT DOCUMENTS

GB 2527822 1/2016

OTHER PUBLICATIONS

GB Combined Search and Examination Report, dated Mar. 22, 2016, GB Patent Application No. GB1600144.8.

* cited by examiner

*Primary Examiner* — Yingchun He
(74) *Attorney, Agent, or Firm* — Vierra Magen Marcus LLP

(57) ABSTRACT

A graphics processing pipeline includes position shading circuitry, a tiler, varying-only vertex shading circuitry and fragment (frontend) shading circuitry. The tiler reads a list of indices defining a set of vertices to be processed by the graphics processing pipeline and determines whether or not vertex shading is required for the positional attributes of the vertices. If vertex shading is required, the tiler sends a position shading request for the vertices to the position shading circuitry. The tiler uses the vertex shaded position data to identify primitives that should be processed further to generate the render output and that accordingly should be subjected to a second, varying shading, vertex shading operation. When the tiler determines that a vertex (or group of vertices) should be subjected to the second, varying shading, vertex shading operation, the tiler sends a varying shading request for the vertex (or vertices) to the varying shading circuitry.

15 Claims, 3 Drawing Sheets

GRAPHICS PROCESSING

BACKGROUND

The technology described herein relates to graphics processing, and in particular to the operation of graphics processing pipelines that perform vertex shading.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc., for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output.

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

(In general "input variables" and "output variables" are the generic terms used for inputs and outputs from shaders (shading stages) in graphics processing pipelines. Before being vertex shaded, a vertex is a collection of "generic vertex attributes" that can be accessed within the vertex shader as input variables. The vertex shader execution then produces a vertex position and any outputs explicitly written by the vertex shader. "Varyings" are the attributes communicated from the vertex shader to rasterisation and fragment shading, not including position. (Thus only the non-position outputs from the vertex shader are "varyings".))

One form of graphics processing pipeline is a so called tile-based graphics processing pipeline, wherein the two-dimensional render output or target is rendered as a plurality of smaller area sub-regions, usually referred to as "tiles". The tiles are each rendered separately (typically one after another). The rendered tiles are then combined to provide the complete rendering output (e.g. frame for display).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

The Applicants believe that there remains scope for improvements for graphics processing pipelines that employ vertex shading.

BRIEF DESCRIPTION OF THE DRAWINGS

Embodiments of the technology described herein will now be described by way of example only and with reference to the accompanying drawings, in which.

Like reference numerals are used for like components in the Figures.

DETAILED DESCRIPTION

Figure 1:
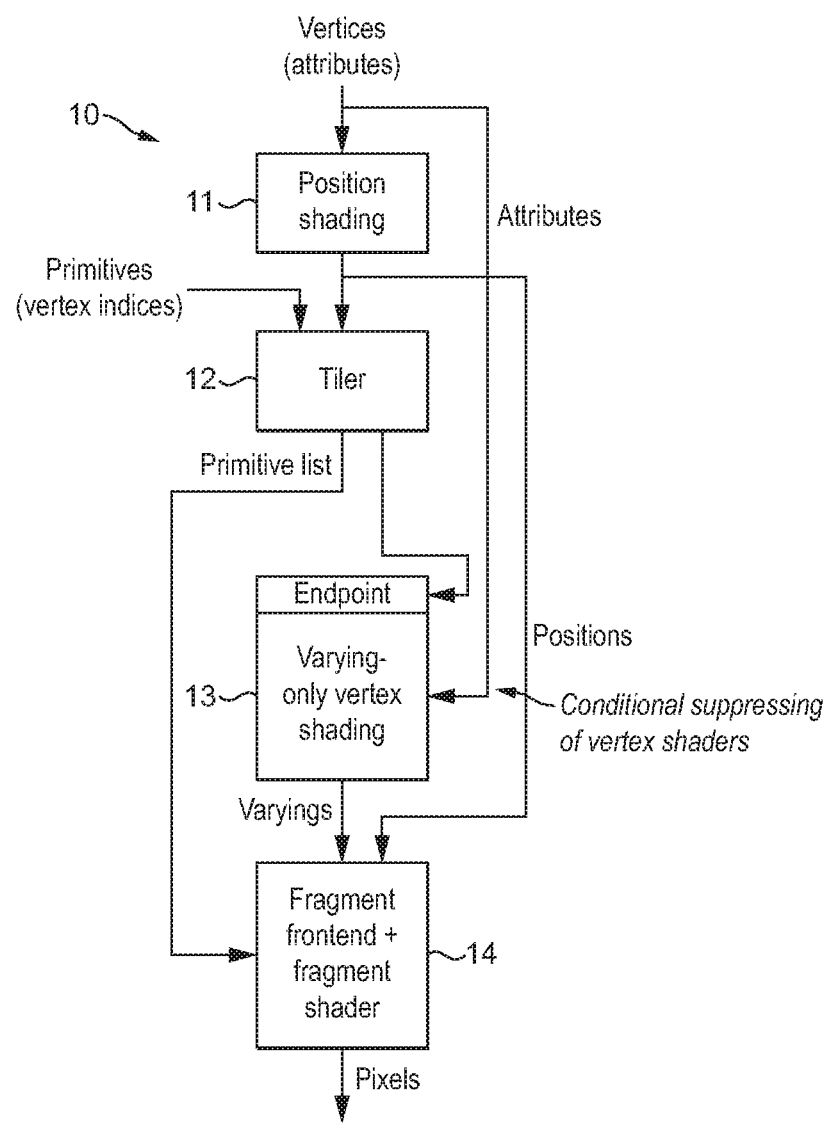
FIG. 1 shows schematically a graphics processing pipeline an embodiment of the technology described herein.

A first embodiment of the technology described herein comprises a method of operating a graphics processing pipeline, the method comprising:

for a set of vertices to be processed by the graphics processing pipeline:

a vertex shading stage of the graphics processing pipeline performing a first vertex shading operation on one or more vertices of the set of vertices, to generate vertex shaded attribute data for at least one but not all of a plurality of vertex attributes of the one or more vertices of the set;

a testing stage of the graphics processing pipeline determining, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;

the testing stage, in response to determining that a second vertex shading operation should be performed for a vertex or group of vertices, sending a request for a second vertex shading operation to be performed for the vertex or group of vertices; and in response to the request from the testing stage, a vertex shading stage of the graphics processing pipeline performing a second vertex shading operation on the vertex or group of vertices for which the request has been sent, to generate vertex shaded attribute data for the at least one other vertex attribute of the plurality of vertex attributes of the one or more vertices of the set.

A second embodiment of the technology described herein comprises a graphics processing pipeline, comprising:

a vertex shading stage configured to perform a first vertex shading operation on one or more vertices of a set of vertices to be processed by the graphics processing pipeline, to generate vertex shaded attribute data for at least one but not all of a plurality of vertex attributes of the one or more vertices of the set;

a testing stage configured to determine, for respective vertices or groups of vertices that have been subjected to the first vertex shading operation, whether or not a second vertex shading operation to generate vertex shaded attribute data for at least one other vertex attribute of the plurality of vertex attributes of the one or more vertices should be performed for the vertex or group of vertices, wherein the determination comprises using, at least in part, some or all of the vertex shaded attribute data generated by the first vertex shading operation;

the testing stage being further configured to, in response to determining that a second vertex shading operation should be performed for a vertex or group of vertices, send a request for a second vertex shading operation to be performed for the vertex or group of vertices; and the graphics processing pipeline further being configured to, in response to the request from the testing stage:

perform a second vertex shading operation on the vertex or group of vertices for which the request has been sent, to generate vertex shaded attribute data for the at least one other vertex attribute of the plurality of vertex attributes of the one or more vertices of the set.

In the technology described herein, unlike in conventional vertex shading arrangements, the vertex shading operation is divided into two parts (the technology described herein uses a "two-pass" vertex shading arrangement), a first vertex shading operation that generates vertex shaded data for some but not all of the vertex attributes, and a second vertex shading operation that generates vertex shaded data for vertex attributes that were not processed in the first vertex shading operation. Between the first and second vertex shading operations is a testing operation in which vertex shaded data from the first vertex shading operation is used, at least in part, to determine if the second vertex shading operation (to generate vertex shaded attribute data for the at least one other vertex attribute of the plurality of vertex attributes belonging to the vertex or group of vertices) should be performed for the vertex or group of vertices in question. The vertices that it has been determined that second vertex shading operation should be performed for are then subjected to the second vertex shading operation.

The Applicants have recognised that in many cases not all the vertices defined for an, e.g. draw call, will in fact be used to generate the desired graphics output, e.g. frame for display. This may occur, e.g., when one or more vertices lie outside of the view frustum or when one or more vertices belong (solely) to back facing primitives. The Applicants have further recognised that any vertex shading computations performed for such "unused" vertices are ultimately redundant.

The technology described herein addresses this by providing a system that can avoid redundant vertex shading computations. This is achieved, as mentioned above, by splitting the vertex shading into two stages, and conditionally executing the second stage for the vertices that it is determined should be processed further (e.g. that are determined to be required to generate the graphics processing output). In this way, only a reduced set of vertex shading operations is performed for vertices that it can be determined will in fact be "unused".

The testing stage of the technology described herein is also configured to send a request for the second vertex shading operation to be performed for a vertex or group of vertices when it determines that the second vertex shading operation should be performed for a given vertex or group of vertices.

In other words, requests to trigger the second vertex shading operation for a vertex or group of vertices are sent as and when it is determined by the testing stage (the testing operation) that the second vertex shading operation should be performed for the vertex or group of vertices in question. (In contrast, e.g., to arrangements in which the testing stage tests all the vertices or groups of vertices of the set of vertices being processed, and then only after that is the second vertex shading operation triggered for the vertices or groups of vertices that are to undergo the second vertex shading operation.)

The effect of this is that the second vertex shading operation can be (and typically will be) executed shortly after the first vertex shading operation, and such that any vertex data which has already been read in and stored in local memory (e.g. cached) for use during the first vertex shading operation is (more) likely still to be present in the local memory (e.g. cache) such that it can be used for the second vertex shading operation without having to read that data in from, e.g., main memory. This can then, e.g., make the second vertex shading operation more efficient, as there is no need to wait for vertex data to be read from, e.g., main memory. It can also, correspondingly, avoid or reduce the need to have to re-read the vertex data in from main memory again, thereby, e.g., reducing memory bandwidth, power consumption, etc. It can also avoid the need to run the second vertex shading operation as a second, separate pass, after operations, such as tiling, have been performed.

The set of vertices that is being processed in the arrangements of the technology described herein can be any desired and suitable set of vertices to be processed by the graphics processing pipeline. Thus the set of vertices may comprise (and in one embodiment does comprise) the entire set of vertices defined for a given graphics processing output (render target), such as for a frame to be displayed. It may also comprise a set of vertices that is defined for less than the entire render output, such as a set of vertices defined for a given draw call. In an embodiment, the set of vertices is a set of vertices defined for a draw call.

(Where the set of vertices is less than the entire set of vertices defined for a given render output, then in an embodiment the operation in the manner of the technology described herein is repeated for each set of vertices (e.g., and in an embodiment, each draw call) of the render output. Correspondingly, the process of the technology described herein is in an embodiment repeated for plural, and in an embodiment for each, render output to be generated, e.g. for successive frames in a sequence of output frames.)

The first vertex shading operation that processes (vertex shades) one or more vertices of the set of vertices may process only some but not all of the vertices of the set of vertices, but in an embodiment processes all of the vertices of the set of vertices being processed (i.e. each vertex in the set of vertices being processed is subjected to the first vertex shading operation).

The first vertex shading operation performs vertex shading for at least one but not all of the vertex attributes of the vertices (i.e. for some but not all of the vertex attributes).

The at least one vertex attribute that is processed in the first vertex shading operation can be any one or more desired and suitable vertex attribute. There may be only one attribute that is processed, or there may be plural attributes that are processed.

In an embodiment, the attribute(s) that is processed in the first shading operation is dependent on one or more conditions that must be met if a vertex is to be subjected to the second vertex shading operation.

In an embodiment, the vertex attributes that are processed in the first vertex shading operation comprise one or more position attributes of the vertices. Usually there will only be a single position attribute, consisting of (X, Y, Z, W) components. In this case, the vertex attributes that are processed in the first vertex shading operation will comprise (at least) that single position attribute. However, there may also be other position attributes, such as a point size or a line width (e.g. when rendering points and lines).

In an embodiment all the position attributes are vertex shaded in the first vertex shading operation, but less than all, such as only one of the position attributes could be processed, if desired. In one embodiment, only position attributes are processed in the first vertex shading operation (and thus in an embodiment no varyings are processed in the first vertex shading operation), but it would also be possible to process one or more other (non-position) attributes as well as one or more position attributes, if desired.

In embodiments of the technology described herein, the first vertex shading operation comprises performing vertex shading computations on the position attributes (position data) of the vertices of the set being processed. Thus, the first vertex shading operation in an embodiment transforms at least, and in an embodiment only, the position attributes of the vertices being processed.

The vertex shaded attribute data that is generated by the first vertex shading operation can comprise any desired and suitable such data, and will, e.g., depend upon the vertex attributes that the first vertex shading operation processes. As discussed above, the vertex shaded data generated by the first vertex shading operation in an embodiment comprises (at least) vertex shaded position data (e.g. the transformed geometry) for the vertices. The vertex shaded data may also comprise vertex shaded data for one or more of the non-position vertex attributes.

The vertex shaded attribute data that is generated by the first vertex shading operation should be, and is in an embodiment, stored appropriately for subsequent use by the graphics processing pipeline. It is in an embodiment stored in the normal manner for vertex shaded attributes in the graphics processing pipeline (system) in question. (There will also be original, i.e. non-vertex shaded, vertex data (attributes) at this stage.)

It is then determined for respective vertices or groups of vertices of the one or more of the vertices that have been subjected to the first vertex shading operation whether that vertex (or group of vertices) should be subjected to a second vertex shading operation. This can be done once the first vertex shading operation has been completed for all the vertices of the set in question (once all the vertices to be subjected to the first vertex shading operation have been processed). However, the determination is in an embodiment performed for a vertex (or group of vertices) as soon as the vertex (or group of vertices) has been processed in the first vertex shading operation. This facilitates for example, reuse of any already cached vertex data that has been cached for the first vertex shading operation.

Thus, in an embodiment, the determination of whether a vertex or a group of vertices should be subjected to the second vertex shading operation is in an embodiment performed once the first vertex shading operation has been completed for that vertex or group of vertices, and without waiting for the first vertex shading operation to be completed for all (and, in an embodiment, for other and in an embodiment for any other) of the vertices in the set of vertices being processed.

The determination is in an embodiment done for all the vertices that have been subjected to the first vertex shading operation (although this is not essential, and if desired only some but not all of the vertices that have been subjected to the first vertex shading operation could be subjected to this determination).

The determination of whether a vertex (or group of vertices) should be subjected to a second vertex shading operation following the first vertex shading operation can be performed in any desired and suitable manner and using any desired and suitable test to determine if the vertex (or group of vertices) should be subjected to the second vertex shading operation.

In an embodiment, this process determines whether the vertex (or group of vertices) could be required for generating the output of the overall graphics processing operation in question (i.e. whether the vertex could be needed to contribute to the output of the graphics processing operation).

The determination is in an embodiment carried out in an appropriately conservative manner, so as to only discard from further processing any vertices that it can be determined with sufficient certainty will not be required for generating the output of the graphics processing operation.

In an embodiment, this determination comprises determining whether the vertex belongs to (is to be used for) a primitive that could be visible in the output of the graphics processing operation (and if it is determined that the vertex (or group of vertices) does not belong to (is not used for) any primitives that could be visible in the output of the graphics processing operation, then the vertex (or group of vertices) is not required for generating the output of the graphics processing operation (and so should not be (and in an embodiment is not) subjected to the second vertex shading operation).

In an embodiment, a vertex (or group of vertices) is determined as being required for generating the output of the graphics processing operation if the vertex (or group of vertices): belongs to a primitive that lies at least partially within the view frustum for the output being generated and/or belongs to a forward facing primitive. In an embodiment, if a vertex (or group of vertices) is determined to belong to a forward facing primitive that lies at least partially within the view frustum, it is determined as being required for generating the output of the graphics processing operation (and a request for a second vertex shading operation to be performed for the vertex (or group of vertices) is sent by the testing stage). Correspondingly, any vertex that solely belongs to primitives that lie entirely outside the view frustum or that are backward facing is in an embodiment determined as not being required (and so, in an embodiment, is not processed further).

The determination of whether a vertex (or group of vertices) should be subjected to the second vertex shading operation uses, as discussed above, at least in part, vertex shaded data from the first vertex shading operation. As discussed above, this vertex shaded data will depend upon the nature of the determination, but in an embodiment comprises vertex shaded position data (attributes) for the vertices in question (as it is the position data for the vertices (and for the primitives that they form) that is needed, for example, to determine whether vertices and primitives lie within the view frustum or not).

The testing stage that determines whether a vertex (or group of vertices) should be subjected to a second vertex shading operation following the first vertex shading operation can be any desired and suitable stage and element of the graphics processing pipeline. For example, a specific testing stage for performing this determination could be included in the graphics processing pipeline.

However, in an embodiment, the determination is performed by an existing (processing) stage of the graphics processing pipeline, in an embodiment by a stage that would otherwise normally perform as part of its "normal" processing operations a test or tests that can be used for the determination.

Thus, in an embodiment, the testing stage of the graphics processing pipeline that determines whether a vertex or group of vertices should be subjected to the second vertex shading operation comprises a stage of the graphics processing pipeline that performs another processing operation or operations for the graphics processing pipeline, in addition to the test or tests that are used for the determination (and/or for which processing stage the test or tests that can be used for the determination are part of its overall processing operations, but the stage performs other processing operations as well).

In an embodiment, the graphics processing pipeline is a tile based graphics processing pipeline, and the tiler (the tiling stage) of the graphics processing pipeline (i.e. the stage of the graphics processing pipeline that sorts the primitives into respective regions of the render output and prepares appropriate lists of primitives for processing for each such region of the render output (e.g. frame)) performs the determination of whether the vertices should be subjected to a second vertex shading operation. Thus, in an embodiment, the testing stage is a tiler of the graphics processing pipeline.

Typically, the tiler will determine (from the vertex shaded position attributes for the vertices) which primitives are potentially visible in the render target being generated, and thus should e.g. be subjected to the second vertex shading operation. For example, the tiling process will normally test whether primitives are (at least partially) within the view frustum and are therefore required for generating the output of the graphics processing operation. The tiler will also typically include a backward facing culling test.

Thus, the tiler is an ideal stage of the graphics processing pipeline for performing the determination, as the tiler already operates to perform "visibility" tests (such as view frustum and/or back facing tests and so on) on primitives of the scene to be displayed.

Thus, if a primitive is included in a tile list by the tiler (the tiling process), that can be taken as an indication that (and a determination that) the primitive (and thus its vertices) could be required for generating the output of the graphics processing operation.

Thus, in an embodiment, a vertex (or group of vertices) is subjected to the second vertex shading operation if it is determined to belong to a potentially visible primitive at the tiling stage, i.e. if a primitive that it belongs to (that it is to be used for) is included in a primitive list at the tiling stage.

Correspondingly, in an embodiment, the determining of whether a vertex should be subjected to a second vertex shading operation comprises determining whether the vertex belongs to (is to be used for) a primitive that has been included in a primitive list for the graphics processing operation being performed.

The tiler (and the testing stage, if not the tiler) can use any suitable and desired methods to determine which vertices should be subjected to a second vertex shading operation, such as tests on the vertices (or on the primitives to which the vertices belong) based on bounding boxes, back facing determinations, or any other suitable tests that can, e.g. be performed in a tiler (at the tiling stage).

When the testing stage determines that a vertex or group of vertices should be subjected to a second vertex shading operation, the testing stage (e.g. tiler) sends a request for the second vertex shading operation to be performed for the vertex (or group of vertices).

The request for the second vertex shading operation to be performed is sent as and when it is determined by the testing stage that the vertex or group of vertices in question should be subjected to the second vertex shading operation. In other words, a determination by the testing stage that a vertex or group of vertices should be subjected to the second vertex shading operation triggers the sending of the request for the second vertex shading operation to be performed for the vertex or group of vertices in question (in contrast, e.g., to simply recording that the vertex or group of vertices have "passed" the test and so be subjected to the second vertex shading operation, with any request or process to trigger the second vertex shading operation for the vertex or group of vertices then being sent or triggered later (e.g. after all the vertices in the set of vertices have been subjected to the testing)).

In an embodiment, the request is sent when it is determined that a given vertex or group of vertices should be subjected to a second vertex shading operation, and before it is determined if another (and in an embodiment if the next) vertex (or group of vertices) in the set that has been subjected to the first vertex shading operation should be subjected to the second vertex shading operation.

The request for the second vertex shading operation to be performed can take any suitable and desired form. In an embodiment, the request comprises information needed by the graphics processing pipeline to be able to carry out the second vertex shading operation. In an embodiment the request includes information (an indicator) that identifies it as being a request to trigger the second vertex shading operation, and/or an identifier that identifies the request.

In an embodiment, the request indicates one or more of, and in an embodiment all of: a job (task) identifier (ID), an index identifier (ID), an instance identifier (ID), and a memory identifier (ID). The job ID in an embodiment identifies the graphics processing job (task), e.g., and in an embodiment, the draw call, that the vertex or group of vertices in question relate to, and in an embodiment identifies, in an embodiment uniquely, the shader program to run (to be executed), and/or the configuration of attributes and/or stacks, etc., and/or other information, that is required to run (execute) a shader program. This information is in an embodiment static for the entire job (task) (e.g. draw call). The index ID and instance ID information in an embodiment indicates the vertex (or vertices) within the job (task) in question. The memory ID information in an embodiment indicates the location in memory at which the output (vertex-shaded attributes data) should be stored. The memory ID could comprise a base address and a request identifier (ID) indicating a memory position offset from the base address.

The request to trigger the second vertex shading operation can be sent by the testing stage (e.g. tiler) to any desired and suitable stage of the graphics processing pipeline so as to trigger the second vertex shading operation.

For example, the request could be sent directly to a shader core that is configured to execute vertex shading operations. However, in an embodiment, the request is sent to a stage of the graphics processing pipeline that is configured to manage (control) one or more processes of the graphics processing pipeline. In an embodiment the request is sent to a stage of the graphics processing pipeline that receives and/or distributes respective processing tasks (jobs) to processing units (functional units) of the graphics processing pipeline.

For example, the request can be (and in an embodiment is) sent to a job (task) management stage (a job manager) of the graphics processing pipeline, which manager stage of the graphics processing pipeline can and in an embodiment does then trigger the second vertex shading operation for the vertex or group of vertices in question, e.g., and in an embodiment, by issuing that vertex shading operation to an available shader processing (execution) core.

In an embodiment, the request for the second vertex shading operation can be, and in an embodiment is, acknowledged, e.g., and in an embodiment, by the graphics processing pipeline stage that the request is sent to. The request and acknowledgement may, e.g., include appropriate "handshaking" fields for this purpose. The acknowledgement in an embodiment includes the identifier for the request, so that the request and its acknowledgement can be matched.

The performing of the second vertex shading operation for the vertex or group of vertices to which a request that operation relates can be triggered and done in any suitable and desired manner.

For example, where the second vertex shading operation is performed by executing execution threads for the vertices to which the request relates then in one embodiment, an execution thread for the second vertex shading operation is only generated and issued if a request for a second vertex shading operation is sent for a vertex (or group of vertices).

However, in a different embodiment, threads for execution are created for the second vertex shading operation for all the vertices in the set, before it is determined whether the vertices should be subjected to the second vertex shading operation. Each thread is then in an embodiment only "fully" executed if an appropriate request is sent from the testing stage.

In this arrangement, each execution thread is in an embodiment configured to determine at the start of its execution sequence, whether the vertex (or group of vertices) to which it relates should be subjected to the second vertex shading operation or not, with the thread then being configured to execute the second vertex shading operation in dependence upon the determination.

To facilitate this, in these arrangements, the instruction sequence to be executed by each thread for the second vertex shading operation in an embodiment includes an, in an embodiment initial, or at least early, instruction, in an embodiment in the shader program preamble, to check if the vertex (or group of vertices) in question should be subjected to the second vertex shading operation.

In this case, the remaining instructions (e.g. for the remaining vertex shading computations) for a thread are then in an embodiment conditionally executed based on whether a request has been sent by the testing stage.

For example, if it is determined that a request has not been sent, the thread is in an embodiment killed at that point (such that it does not execute the remaining vertex shader instructions for that vertex), but if a request has been sent, the thread executes the remaining instructions, so as to perform the second vertex shading operation for that vertex (or group of vertices).

It will be appreciated here that although in this arrangement threads for each vertex will be generated (even if some of the vertices (and thus threads) will not be required), this arrangement can still (significantly) reduce the processing load on the system by not having to execute the entire vertex shader (beyond the check operation) for some threads.

The second vertex shading operation operates to "vertex shade" at least one other attribute of the vertex or group of vertices that it has been determined should be subjected to a second vertex shading operation. In an embodiment, the second vertex shading operation vertex shades all the remaining attributes of the vertices in question. It may also vertex shade the attributes that were processed by the first vertex shading operation, but that is not favoured (as vertex shaded versions of those attributes will have already been derived by the first vertex shading operation).

The second vertex shading operation in an embodiment operates to vertex shade the varyings (i.e. non-position attributes) for the vertices, such as one or more of, and in an embodiment all of: colour, texture coordinates, normals, etc.

The partitioning of the vertex attributes between the first and second vertex shading operations can be selected as desired, e.g. based on the relative processing requirements of the attributes.

The first and second vertex shading operations are in an embodiment implemented by means of a vertex shader core executing an appropriate vertex shader (vertex shading program) for the vertices. Each vertex to be processed is in an embodiment represented as an execution thread, which threads execute the appropriate vertex shading program to carry out the vertex shading operations. In an embodiment there is one execution thread per vertex to be processed.

Thus the first and second vertex shading operations are in an embodiment implemented using execution threads that execute a sequence of program instructions that effect the first vertex shading operation.

The vertex shader (vertex shading program) that the vertex execution threads execute for the first and second vertex shading operations can be configured in any desired and suitable manner. The vertex shader (that the vertex execution threads execute for the first and second vertex shading operations) in an embodiment comprises limited (e.g. lightweight) versions of the vertex shader that has been defined for the graphics processing output (e.g. draw call) in question. For example, for each vertex shading operation, the vertex shading program in an embodiment comprises only part but not all of the vertex shader that has been defined for the graphics processing output (e.g. draw call) in question.

The configuration of the vertex shader (vertex shading program) for the first vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the first vertex shading operation and then recompiled.

Correspondingly, the configuration of the vertex shader (vertex shading program) for the second vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the second vertex shading operation and then recompiled.

In an embodiment, the operation to do this comprises parsing the complete vertex shader (vertex shading program) supplied by the application that requires the graphics processing (i.e. that has been defined for the graphics processing output in question), and then creating two copies of the parsed shader program, and in one copy of the parsed shader program deleting all output attributes except the position output and, in an embodiment, performing dead code elimination to remove all code that does not contribute to the position output, and then in the other copy deleting the position output and optimising the shader program. The first copy of the shader program where all output attributes except the position output have been deleted is then used for the first vertex shading operation, with the second copy for which conversely the position output has been removed then being used for the second vertex shading operation. This then straightforwardly gives the shader code that is needed for the two vertex shading operations of the technology described herein. This may be done by any suitable element of the overall graphics processing system, such as, and in an embodiment, the compiler for the vertex shader.

The first and second vertex shading operations (vertex shading stages) could be implemented in separate vertex shading execution cores of the graphics processing pipeline. However, in an embodiment they are performed as respective, different, passes in the same vertex shading execution core.

Other arrangements for deriving the vertex shaders (the vertex shading programs) for the first and second vertex shading operations would, of course, be possible.

In an embodiment of the technology described herein, the graphics processing pipeline is configured to keep track of vertices and/or groups of vertices that have been subjected to the second vertex shading operation.

This may be achieved in any suitable and desired manner. In an embodiment information indicating vertices and/or groups of vertices that have been subjected to the second vertex shading operation is maintained and stored. This information is in an embodiment then used at the testing stage to determine whether a vertex (or group of vertices) that it has been determined should (potentially) be subjected to the second vertex shading operation has already been subjected to the second vertex shading operation.

Thus, in an embodiment of the technology described herein, the determination of whether a vertex (or group of vertices) should be subjected to the second vertex shading operation (additionally) comprises determining whether the vertex (or group of vertices) has been previously subjected to the second vertex shading operation, using, at least in part, information indicating vertices and/or groups of vertices that have been subjected to the second vertex shading operation.

When it is determined that a vertex (or group of vertices) has already been subjected to the second vertex shading operation, then the vertex (or group of vertices) is in an embodiment not subjected to the second vertex shading operation.

Correspondingly when it is determined that a vertex (or group of vertices) has not already been subjected to the second vertex shading operation, then the vertex (or group of vertices) is in an embodiment subjected to the second vertex shading operation.

Thus, in an embodiment, the testing stage (e.g., the tiler) of the graphics processing pipeline is operable to determine from information indicating vertices and/or groups of vertices that have already been subjected to the second vertex shading operation, whether a vertex or group of vertices has already been subjected to the second vertex shading operation, and when it is determined from the information that the vertex or group of vertices has already been subjected to the second vertex shading operation, then the testing stage does not send a request for the vertex or group of vertices to be subjected to the second vertex shading operation, but when it is not (it is other than) determined that the vertex or group of vertices has already been subjected to the second vertex shading operation from the information, then the testing stage sends a request for the vertex or group of vertices to be subjected to the second vertex shading operation.

The Applicants have recognised in this regard that as a consequence of requesting (and performing) the second vertex shading operation as soon as a vertex (or group of vertices) is determined as being required for generating the output, there may be an increased risk of a given vertex or vertices being (unnecessarily) subjected to the second vertex shading operation multiple times (e.g. where the vertex (or group of vertices) is used for multiple primitives). Keeping track of vertices that have already been subjected to the second vertex shading operation helps to avoid (or at least reduce) the risk of processing the same vertex twice (e.g. where the vertex is used for multiple primitives).

Thus, in an embodiment, the testing stage (e.g., and in an embodiment, the tiler) of the graphics processing pipeline is operable to determine whether or not a second vertex shading operation to generate vertex shaded attribute data for at least one other vertex attribute of the plurality of vertex attributes of the one or more vertices of the set should be performed for a vertex or group of vertices by:

first determining whether the vertex or group of vertices could be required for generating the output of the graphics processing operation (in an embodiment by determining whether the vertex belongs to (is to be used for) a primitive that could be visible in the output of the graphics processing operation); and when it is determined that the vertex or group of vertices could be required for generating the output of the graphics processing operation:

then determining from information indicating vertices and/or groups of vertices that have already been subjected to the second vertex shading operation, whether the vertex or group of vertices has already been subjected to the second vertex shading operation; and when it is determined from the information that the vertex or group of vertices has already been subjected to the second vertex shading operation, then not sending a request for the vertex or group of vertices to be subjected to the second vertex shading operation, but when it is not (it is other than) determined that the vertex or group of vertices has already been subjected to the second vertex shading operation from the information, then sending a request for the vertex or group of vertices to be subjected to the second vertex shading operation.

Thus, in an embodiment, the testing stage (e.g. the tiler) includes two processing stages or units, a first processing stage which determines whether a vertex or group of vertices could be required for generating the output of the graphics processing operation, which stage if it determines that the vertex or group of vertices could be required for generating the output of the graphics processing operation, then in an embodiment signals a subsequent stage that uses information indicating vertices and/or groups of vertices that have already been subjected to the second vertex shading operation to determine whether to actually send a request for the second vertex shading operation for the vertex or group of vertices (and that in an embodiment then sends the request, if required). In the case of a tiler of a tiled-based graphics processing pipeline at least, the first stage is in an embodiment some form of visibility determining stage, such as a bounding box testing stage, and the second stage is in an embodiment in the form of a vertex information checking unit.

Thus in an embodiment, the testing stage, e.g., and in an embodiment the tiler, includes, in effect, a visibility testing stage that determines whether a vertex or group of vertices is required for the graphics processing output being generated, and when it is determined that the vertex or group of vertices is required for the graphics output being generated (e.g., and in an embodiment, is (potentially) visible), that information is provided to a further checking unit, that then checks stored information indicating vertices or groups of vertices that have already undergone the second vertex shading operation, which checking unit then sends (or not) the request for the second vertex shading operation to be performed for the vertex or group of vertices in question accordingly.

The information indicating which vertices have been subjected to the second vertex shading operation can be stored in any suitable and desired storage that is able to be accessed by the graphics processing pipeline. For example, it could be a dedicated memory for the purpose of storing such information, or it may be part of a memory that is used to store other data in addition to such information. The storage may be any suitable and desired information storage, such as, e.g., a buffer or buffers, a cache or caches, etc. In an embodiment, this information is stored in a local, cache memory, of or accessible to the testing stage of the graphics processing pipeline (or an appropriate stage thereof).

The information indicating which vertices have been subjected to the second vertex shading operation can take any desired and suitable form.

In an embodiment, this information in the form of a (vertex) bitmap, that includes respective entries for respective vertices or groups of vertices. Thus, each entry (bit) in the vertex bitmap will indicate whether a vertex (or a group of vertices) has been subjected to the second vertex shading operation. For example, each entry in the vertex bitmap can have a value of "0" or "1", which will indicate whether or not the vertex (or group of vertices) associated with the entry in question has been subjected to the second vertex shading operation.

In one embodiment, the vertex bitmap has a single bit for each individual vertex. In this case, each bit in the vertex bitmap will correspond to a different vertex.

In other embodiments, a bit (and in an embodiment each bit) in the vertex bitmap corresponds to a group of vertices. For example, the bitmap may be configured such that at least one (and in an embodiment each) bit of the vertex bitmap corresponds to a group of, e.g. 4 or 16, vertices. This arrangement will accordingly provide a more compact vertex bitmap that will use less memory than arrangements where each bit corresponds to a single vertex. In one embodiment, each entry in the bitmap corresponds to a group of 4 vertices.

In an embodiment, if at least one vertex of a group of vertices (for which there is a bitmap entry associated therewith) has not been subjected to the second vertex shading operation, the bitmap is configured to store a value in the bitmap entry for the group which indicates that none of the vertices of the group have been subjected to the second vertex shading operation (even if this is not the case in reality). This will ensure that the one or more vertices of the group that have not been subjected to the second vertex shading operation will be indicated as needing to have their e.g. varying attributes shaded.

In an embodiment, the resolution of the vertex bitmap can be varied in use, e.g. between using a single bit for each individual vertex or each bitmap entry representing a group of plural vertices. This may be useful to, e.g., dynamically vary the size (and thus memory requirements) of the vertex bitmap in use.

The information indicating which vertices have been subjected to the second vertex shading operation can comprise information for all of the vertices defined for the set of vertices to be processed in a manner according to the technology described herein. Correspondingly, where the set of vertices is one of two or more sets of vertices to be processed in a manner according to the technology described herein, the information indicating which vertices have been subjected to the second vertex shading operation can comprise information for all the vertices of each set of vertices to be processed in a manner according to the technology described herein.

However, in an embodiment, information indicating which vertices or groups of vertices have previously been subjected to the second vertex shading operation is only stored for (up to a) particular, in an embodiment selected, number of vertices (or groups of vertices). Thus, for example, instead of storing information (e.g. in bitmap entries) for all of the vertices of a set (or of plural sets) of vertices, this information will be stored for a given number of vertices or groups of vertices only (which may not be and typically will not be all of the vertices of a set (or of plural sets) of vertices to be processed).

In other words, the capacity of the information indicating which vertices or groups of vertices have previously been subjected to the second vertex shading operation is in an embodiment configured to a particular, in an embodiment predefined, in an embodiment fixed, size (in terms of the number of vertices or groups of vertices for which that information can be stored). The size (capacity) of this information should be, and is in an embodiment, fixed at least in respect of a given set of vertices to be processed. It is in an embodiment fixed for at least a given render output (e.g. frame) to be generated. However, in an embodiment, the size of this information storage can be reconfigured in use, e.g. on a render output-by-render output basis.

Storing only a more limited set of information indicating which vertices or groups of vertices have previously been subjected to the second vertex shading operation allows the size of that information to be controlled, thereby, e.g., further facilitating the possibility of storing that information locally to the testing stage (e.g. tiler), and avoiding the need to have to, e.g., write that information out to main memory. Thus this information is in an embodiment stored locally to the testing stage (on-chip) and not stored (at all) in main memory.

In these embodiments where only a fixed, e.g. predetermined, amount of this vertex information is stored, then when the second vertex shading operation is performed for a vertex or group of vertices, the information indicating which vertices have been subjected to the second vertex shading operation is in an embodiment updated to include that new vertex or group of vertices, by replacing the existing information for a previous vertex (or group of vertices) with new information for the latest vertex (or group of vertices).

Thus, for example, when a vertex (or group of vertices) that is not associated with an entry in the bitmap is subjected to the second vertex shading operation, the graphics processing pipeline is configured to allocate a new entry in the vertex information to the vertex (or group of vertices) in question, and set a value for that entry which indicates that the vertex (or group of vertices) has been subjected to the second vertex shading operation.

Where there is free capacity in the store for the vertex information indicating which vertices have been subjected to the second vertex shading operation, then the information relating to the new vertex or group of vertices can simply be added to that information store.

This may be done, for example, by selecting a free line in the vertex bitmap cache and setting an appropriate bit in that cache line to a value that indicates that the vertex (or group of vertices) associated with the bit has been subjected to the second vertex shading operation.

On the other hand, where the information store for the information indicating which vertices have been subjected to the second vertex shading operation is full (i.e. contains information for the maximum number of vertices or groups of vertices permitted), then the information for the new vertex or group of vertices in an embodiment replaces existing information for a previous vertex or group of vertices.

In this case the existing information for a previous vertex or group of vertices that is replaced can be selected as desired, e.g. using any appropriate and desired information replacement (eviction) scheme. In an embodiment a least recently used (a not most recently used) eviction scheme is used.

Thus, for example, if there is not a free line in the vertex bitmap cache, a not most recently used (NRMU) eviction scheme can be used to remove the not most recently used line from the bitmap (cache) (and the information stored therein is forgotten). In this embodiment, the testing stage is configured to replace the information currently stored in the not most recently used line in the bitmap (cache) with a new entry or entries associated with the new vertex (or group of vertices) in question.

The effect of this is that, in effect, information indicating which vertices or groups of vertices have previously been subjected to the second vertex shading operation will be stored for more recently processed vertices or groups of vertices, i.e. a "recent" history of the second vertex shading operations will be maintained. The Applicants have recognised in this regard that while this may result in some vertices or groups of vertices being subjected to the second vertex shading operation more than once (in contrast to a system where this information was maintained for each and every vertex or group of vertices in the set being processed), the order in which vertices will fall to be processed will tend to mean that any repeated vertices or groups of vertices will tend to fall to be processed in relatively quick succession (in the vertex processing order) such that this compromise to the operation of this vertex information should not tend to result in an excessive amount of repeated vertex shading for the same vertices.

The information, e.g. in the vertex bitmap, indicating which vertices have been subjected to the second vertex shading operation can be used in any desired and suitable way to determine if a vertex (or group of vertices) has previously been subjected to the second vertex shading operation.

In an embodiment, the testing stage checks the stored information, indicating which vertices have already been subjected to the second vertex shading operation (e.g. checks the vertex bitmap), to determine whether or not a vertex (or group of vertices) of the set being processed has been subjected to the second vertex shading operation (and should therefore in an embodiment not be subjected to the second vertex shading operation).

For example, for each vertex (or group of vertices) that is determined as being required for generating a graphics processing output, the testing stage could and in an embodiment does then check whether there is stored such information for the vertex (or group of vertices) in question, and if so, then checks that information to determine whether or not it indicates that the vertex (or group of vertices) has already been subjected to the second vertex shading operation.

(It will be appreciated that the testing stage can perform the "check" operation of, e.g., the vertex bitmap, for a single vertex or plural vertices, depending on the type of primitive associated with the vertex (or group of vertices). For example, if the primitive is a point, the testing stage may check the information for the entry corresponding to the single vertex of that point. Correspondingly, if the primitive is a line primitive, the testing stage should check the information for the entry (or entries) corresponding to the two or more vertices of that line.)

If the value that is stored corresponding to the vertex (or group of vertices) indicates that the vertex (or group of vertices) has already been subjected to the second vertex shading operation, that is in an embodiment then taken as an indication that the vertex (or group of vertices) should not be subjected to the second vertex shading operation (because the system will have already generated and stored in memory appropriately vertex shaded attributes data for the one or more other attributes not processed in the first vertex shading operation for the vertex or group of vertices in question (and so no further action is taken for that vertex or group of vertices)).

If the stored information corresponding to a vertex or group of vertices indicates that the vertex or group of vertices has not yet been subjected to the second vertex shading operation, that is in an embodiment then taken as an indication that the vertex or group of vertices should be subjected to the second vertex shading operation (and accordingly will be subjected to the second vertex shading operation by the testing stage, e.g. the tiler, sending a request for second vertex shading operation to be performed for that vertex (or group of vertices)).

Where information indicating that the second vertex shading operation has been performed is stored with respect only to a more limited number of vertices or groups of vertices such that it may not be guaranteed that the vertex (or group of vertices) that is currently being processed in the testing stage has corresponding information stored in memory indicating whether the vertex (or group of vertices) has been previously subjected to the second vertex shading operation, then the determination as to whether a vertex (or group of vertices) has been previously subjected to the second vertex shading operation in an embodiment comprises first determining if the vertex (or group of vertices) has (could have) information indicating whether the vertex (or group of vertices) has previously been subjected to the second vertex shading operation stored for it.

Then, if it is determined for a vertex (or group of vertices) that this information is not stored in memory, that is in an embodiment taken as an indication that the second vertex shading operation has not been performed for the vertex (or group of vertices) in question (and a request for a second vertex shading operation to be performed for the vertex (or group of vertices) will be sent by the testing stage).

On the other hand, if it is determined that a vertex (or group of vertices) has (could have) this information stored for it in memory, then it is in an embodiment determined if the information corresponding to the vertex (or group of vertices) indicates that the vertex (or group of vertices) has previously been subjected to the second vertex shading operation (with the second vertex shading operation then being requested or not, accordingly).

The determination as to whether or not a vertex (or group of vertices) could have information stored for it can be done in any suitable and desired manner.

In an embodiment, this is done by the testing stage performing an initial, coarse test to identify whether the vertex or group of vertices potentially has this information stored for them (e.g., and in an embodiment, if information is indicated as being stored for (at least some of) a larger grouping of vertices that the vertex or group of vertices falls within), and then, if required, reading the stored information itself to determine the status of those vertices.

In an embodiment, this is done by associating entries (or groups of entries) of stored information indicating whether vertices have previously been subjected to the second vertex shading operation with an identifier that allows at least a group of vertices that are represented by the information present in that entry (or entries) to be identified. A copy of each identifier is in an embodiment then stored in a local storage (memory) of the testing stage, so that the testing stage can easily and efficiently determine from those identifiers whether or not a vertex (or group of vertices) has this information stored for it.

Where the information indicating which vertices have been subjected to the second vertex shading operation is stored in cache memory, each cache line (comprising a plurality of bits each representing respective vertices or groups of vertices) is in an embodiment associated with an identifier for the vertex (or vertices) to which the cache line in question relates. In an embodiment, each cache line is associated with a tag that can be used to identify which vertex (or vertices) the line relates to. The tag in an embodiment includes information indicative of the index value of each vertex of the cache line. For example, each tag in an embodiment comprises a valid bit and the upper "most significant bit or bits" (MSB) of each vertex index value. In an embodiment this information for vertices having related, e.g. and in an embodiment, successive indexes, is stored in a given cache line.

A copy of these cache tags is in an embodiment then stored in local memory of the testing stage (of, e.g., the tiler).

Then, before accessing the full vertex information, the testing stage can, for a given vertex (or group of vertices) that, e.g., has been determined as required for generating a graphics processing output, check the local cache tags to identify whether or not the vertex (or group of vertices) in question is associated with an entry in the vertex information (e.g. bitmap).

If it is determined from the cache tags that the vertex (or group of vertices) in question is not associated with an entry in the, e.g. bitmap, then this is in an embodiment taken as an indication that the vertex (or group of vertices) has not already been subjected to the second vertex shading operation, and so that vertex (or group of vertices) will accordingly be subjected to the second vertex shading operation by the testing stage sending a second vertex shading operation request.

If it is determined from the cache tags that the vertex (or group of vertices) in question is associated with an entry in the, e.g. bitmap, then the testing stage will access the, e.g. bitmap, to check the status of the entry that is associated with that vertex (or group of vertices).

If the value corresponding to that vertex (or group of vertices) indicates that the vertex (or group of vertices) has already been subjected to the second vertex shading operation, this is taken as an indication that the vertex (or group of vertices) should not be subjected to the second vertex shading operation, and that vertex (or group of vertices) will not be subjected to the second vertex shading operation. On the other hand, if the value corresponding to that vertex (or group of vertices) indicates that the vertex (or group of vertices) has not been subjected to the second vertex shading operation, this is taken as an indication that the vertex (or group of vertices) should be subjected to a second vertex shading operation, and the testing stage will send a request for a second vertex shading operation to be performed for that vertex (or group of vertices).

In these arrangements, the updating of the information indicating which vertices have been subjected to the second vertex shading operation in an embodiment takes account of this operation.

Thus, the vertex information (e.g. bitmap) is in an embodiment updated depending on how it has been determined that a vertex (or group of vertices) should be subjected to the second vertex shading operation.

In these cases, it can be determined that a vertex (or group of vertices) should be subjected to the second vertex shading operation in one of two ways: either the vertex (or group of vertices) is associated with an entry in the vertex information, but the value stored for that entry indicates that the vertex (or group of vertices) associated therewith has not already been subjected to the second vertex shading operation; or the vertex (or group of vertices) is not associated with an entry in the vertex information at all.

In the former case, the graphics processing pipeline (e.g. the vertex bitmap unit) can set the existing value of the entry associated with the vertex (or group of vertices) in question to a value indicating that the vertex (or group of vertices) associated therewith has been subjected to the second vertex shading operation.

In the latter case, as the vertex (or group of vertices) that has not previously been subjected to the second vertex shading operation is not associated with an entry in the vertex information, then as discussed above, a new entry in the vertex information will be allocated to and set for the vertex (or group of vertices) in question (to indicate that the vertex (or group of vertices) has been subjected to the second vertex shading operation). Correspondingly an identifier (e.g. cache tag) for that entry is in an embodiment added to the set of stored identifiers (cache tags).

After the second vertex shading operation has been performed for the vertices, then the complete vertex shaded attributes data for those vertices (i.e. the vertex shader data from the first and second vertex shading operations), together with, e.g., the primitive lists generated by the tiler, can be passed to (and used by) the remaining stages of the graphics processing pipeline to generate the desired output (render target) of the graphics processing pipeline. (Of course, where it has been determined that a vertex has already been subjected to the second vertex shading operation, then the complete vertex shaded attributes data for that vertex can be retrieved from memory (and used by) the remaining stages of the graphics processing pipeline to generate the desired output (render target) of the graphics processing pipeline.)

This processing can include, inter alia, primitive (e.g. triangle) setup, rasterisation and rendering. These processes can be performed in any desired and suitable manner, e.g. depending upon the nature of the graphics processing pipeline in question. The final output of the graphics processing operation can then, e.g., be written, e.g. to a frame buffer, in main memory, from where it can then, e.g., be provided to a display for display, or otherwise processed.

In an embodiment of the technology described herein, the graphics processing pipeline is configured to store in memory vertex shaded attributes data for a vertex (or group of vertices) after the vertex (or group of vertices) has been processed in the first vertex shading operation, so that that vertex shaded attributes data for a vertex (or group of vertices) can then be retrieved and reused if the same vertex (or group of vertices) falls to be processed subsequently, e.g., and in an embodiment, for another set of vertices.

The memory used for the vertex shaded attributes data for a vertex (or group of vertices) after the vertex (or group of vertices) has been processed in the first vertex shading operation can be any suitable and desired memory available to the system. In an embodiment, the data is stored in a temporary cache memory (as this would allow easy and efficient access to the memory when required). (However, in this case, the vertex shaded attributes data for a vertex (or group of vertices) is also (potentially) at some point, e.g. after it is determined that the vertex (or group of vertices) should be subjected to a second vertex shading operation, stored in long term memory (e.g. main (system) memory for later use.)

Where this is done, then before performing the first vertex-shading operation for a vertex (or group of vertices), it is in an embodiment first determined whether or not already-shaded vertex attributes data (e.g. positional attributes data) for a vertex (or group of vertices) is stored in memory. If it is determined that that is the case, the already-shaded vertex attributes data (e.g. positional attributes data) can be read in and used, e.g. at the testing stage, instead of generating vertex-shaded attribute data for the vertex (or group of vertices) in the first vertex shading operation.

Thus, in an embodiment the method of the technology described herein comprises (and the graphics processing pipeline is configured to):

determining, for each vertex (or group of vertices) of the set, whether already-shaded vertex attributes data for the at least one but not all of the vertex attributes of the vertex (or group of vertices) is stored in a memory; and when it is determined that already-shaded vertex attributes data for the at least one but not all of the vertex attributes of the vertex (or group of vertices) is stored in a memory, retrieving the already-shaded vertex attributes data for the at least one but not all of the vertex attributes of the vertex (or group of vertices); whereas:

when it is determined that already-shaded vertex attributes data for the at least one but not all of the vertex attributes of the vertex (or group of vertices) is not stored in the memory, performing the first vertex shading operation for the vertex or group of vertices to determine vertex shaded attribute data for the at least one but not all of the vertex attributes of the vertex (or group of vertices).

In this way, having to repeat the first vertex shading operation each time the same vertex (or group of vertices) falls to be processed again (e.g. when processing different sets of vertices) can be (potentially) avoided.

This determination can be done by any suitable and desired stage of the graphics processing pipeline. In an embodiment, the testing stage used to determine if a vertex (or group of vertices) should be subjected to a second vertex shading operation performs this determination. Thus, in an embodiment, the tiling stage of the graphics processing pipeline performs this determination.

Thus, in an embodiment, the same stage (the testing stage), e.g., and in an embodiment, the tiler, both determines whether the first vertex shading operation should be performed for a vertex or group of vertices, and determines whether the second vertex shading operation should be performed for the vertex or set of vertices.

The determination of whether or not already-shaded first vertex shading operation attributes data (e.g. positional attributes data) for a vertex (or group of vertices) to be processed is stored in memory can be carried out as desired and in any suitable manner. In an embodiment, this determination is made by checking whether or not a particular identifier (e.g. an identification number) for the vertex (or group of vertices) in question is the same as an identifier that is associated with any already-shaded vertex attributes data (e.g. positional attributes data) that is stored in the memory. If the identifier of the vertex (or group of vertices) to be processed matches an identifier for vertex shaded attributes data stored in the memory, then that will indicate that already-shaded vertex attributes data for the vertex (or group of vertices) is stored in the memory. Other methods are, of course, possible.

To facilitate this operation, in an embodiment, the vertex shaded attributes data is stored in the memory in association with an identifier (e.g. a cache tag) for the vertex (or group of vertices) that it relates to.

The identifier of the vertex (or group of vertices) to be processed in an embodiment corresponds to the identifiers that are originally assigned to the vertices in the vertex index array provided for the set of vertices (e.g. draw call).

The stage of the graphics processing pipeline that is used for determining whether or not already-shaded vertex attributes data (e.g. positional attributes data) for that vertex (or group of vertices) is stored in memory, or any associated stage of the graphics processing pipeline, in an embodiment stores local copies of the identifiers (e.g. cache tags), so that it can more easily and efficiently determine which vertices this data is stored for.

Thus, an embodiment of the technology described herein, checking whether or not a particular identifier (e.g. an identification number) for the vertex (or group of vertices) in question is the same as an identifier that is associated with any already-shaded vertex attributes data (e.g. positional attributes data) that is stored in the memory comprises: checking whether or not a particular identifier (e.g. an identification number) for the vertex (or group of vertices) in question is the same as an identifier that is stored in local memory of, e.g. the testing stage.

If a particular identifier (e.g. an identification number) for the vertex (or group of vertices) in question is the same as an identifier that is stored in local memory, this can be taken as an indication that already-shaded vertex attributes data (e.g. positional attributes data) for the vertex is stored in the memory. However, if a particular identifier (e.g. an identification number) for the vertex (or group of vertices) in question is not the same as an identifier that is stored in local memory, this can be taken as an indication that already-shaded vertex attributes data (e.g. positional attributes data) for the vertex is not stored in the memory.

As mentioned above, if it is found that already-shaded vertex attributes data (e.g. positional attributes data) for the vertex (or group of vertices) that is to be processed is stored in the memory, then the vertex (or group of vertices) does not need to be subjected to the first vertex shading operation. Instead, the already-shaded vertex attributes data (e.g. positional attributes data) is in an embodiment read in and used at the testing stage to determine if the vertex (or group of vertices) should be subjected to the second vertex shading operation. (It will be appreciated here that the already-shaded vertex attributes data (e.g. positional attributes data) may first be passed to (and used by) an appropriate stage of the graphics processing pipeline that assembles the primitives for further processing.)

If it is found that already-shaded vertex attributes data (e.g. positional attributes data) for the vertex (or group of vertices) that is to be processed is not stored within the memory, then the vertex (or group of vertices) will be subjected to the first vertex shading operation. The resulting generated vertex shaded attribute data is then used at the testing stage to determine if the vertex (or group of vertices) should be subjected to the second vertex shading operation.

In order to read in the vertex shaded attributes data (be it already-shaded vertex attributes data or newly shaded vertex attributes data), the graphics processing pipeline in an embodiment in an embodiment comprises a "fetcher" stage for this. For example the graphics processing pipeline, in an embodiment the tiling stage (the tiler) thereof, in an embodiment comprises a "vertex fetcher" stage to read in the vertex shaded attributes data from memory. The vertex fetcher in an embodiment includes a vertex cache in which already vertex-shaded attributes data is stored. In an embodiment, this stage is associated with a pre-fetcher stage (thus a "vertex" prefetcher) that determines whether or not already-shaded vertex attributes data (e.g. positional attributes data) for a given vertex (or group of vertices) is stored in memory. For example, the vertex pre-fetcher and the vertex fetcher may share appropriate circuitry. In an embodiment, they both maintain a (respective) (their own) locally stored copy of the identifiers (cache tags) that identify the vertices for which already vertex-shaded attributes data is stored in memory.

Where it is determined in these arrangements that the first vertex shading operation needs to be performed for a vertex or group of vertices, then that operation can be triggered in any suitable and desired manner, but is in an embodiment triggered by the sending of an appropriate request for the first vertex shading operation to be performed for the vertex or group of vertices in question.

Thus, in an embodiment, requests can be and are sent for performing the first vertex shading operation for a vertex or group of vertices. Correspondingly, in an embodiment, the testing stage, e.g. the tiler, is operable to send (and sends) requests for the first vertex shading operation to be performed for vertices or group of vertices (that that operation is to be performed for).

Thus, in an embodiment, the testing stage of the graphics processing pipeline determines (and is operable to determine) for respective vertices or groups of vertices of the set of vertices, whether or not a first vertex shading operation to generate vertex shaded attribute data for at least one but not all of a plurality of vertex attributes of the one or more vertices of the set should be performed for the vertex or group of vertices, and, in response to determining that a first vertex shading operation should be performed for a vertex or group of vertices, sends a request for the first vertex shading operation to be performed for the vertex or group of vertices (with a vertex shading stage of the graphics processing pipeline then performing the first vertex shading operation for the vertex or group of vertices for which the request has been sent, to generate vertex shaded attribute data for at least one but not all of a plurality of vertex attributes of the one or more vertices of the set, in response to the request from the testing stage).

Again, this request is in an embodiment sent to an appropriate stage, such as, and in an embodiment, a job manager, of the graphics processing pipeline that can then, e.g., trigger a shader execution core to perform the first vertex shading operation for the vertex or group of vertices in question.

This request in an embodiment has a similar format to, and in an embodiment the same format as, the request for triggering the second vertex shading operation, save that it includes an identifier that identifies it as being a request for the first vertex shading operation (rather than for the second vertex shading operation).

In an embodiment, particularly where the testing stage determines both whether the first vertex shading operation should be performed and whether the second vertex shading operation should be performed for vertices or groups of vertices, then the respective requests for those vertex shading operations are sent via the same communications interface to the relevant pipeline stage (e.g. job manager). Thus, in an embodiment, in the case of a tile-based graphics processing pipeline, the tiler is operable to send requests both for the first vertex shading operation and for the second vertex shading operation, in an embodiment via the same communications interface (from the tiler to another functional unit or units of the graphics processing pipeline).

Again, a request for the first vertex shading operation is in an embodiment sent when it is determined that that first vertex shading operation needs to be performed for a vertex or group of vertices (in response to determining that that first vertex shading operation needs to be performed for a vertex or group of vertices), i.e. the operation is correspondingly performed in an "on demand" manner as and when it is determined for vertices and/or groups of vertices that that operation is required, in a similar manner to the requesting of the second vertex shading operation. Thus, e.g., the tiler, is in an embodiment operable to request both the first and the second vertex shading operations in an on demand manner as it processes and tests vertices and groups of vertices.

As will be appreciated from the above, the operation in the manner of the technology described herein can be performed for individual vertices, or for groups of plural vertices together, as required. This can be in respect of the various processing (e.g. testing) operations, the vertex shading operations, and the sending of the requests for the vertex shading operations.

In an embodiment, a (and in an embodiment each) request that is sent for the vertex shading operations relates to (and requests the corresponding vertex shading operation for) a group of plural vertices, e.g., and in an embodiment, for a group of four vertices. This is in an embodiment done irrespective of whether the actual testing and determination is performed for individual vertices or groups of vertices. This has the advantage of reducing the number of requests that need to be sent in the system (and the resources required, e.g., to track those requests), and also facilitates more efficient cache use for the relevant data.

In this case therefore, where, e.g., a single vertex is tested, then either a request could be sent for that vertex together with one or more other vertices, e.g. three other vertices (where a request relates to groups of four vertices), to undergo the vertex shading operation in question, or the system could wait until, e.g., four, vertices have been determined as needing to be subject to a vertex shading operation before a corresponding request for those, e.g. four, vertices to be subjected to the vertex shading operation is sent.

In the former case, once a vertex is determined as needing to undergo a vertex shading operation, the other vertices that the request indicates as to undergo the operation (in addition to the vertex in question) are in an embodiment vertices that could be related to and/or associated with the vertex in question, such as, and in an embodiment, the next vertices in the vertex index sequence.

The process of the technology described herein can be repeated for the next render output (e.g. the next frame to be displayed) and so on. The technology described herein is in an embodiment implemented for a sequence of frames to be displayed, and in an embodiment for each frame in a sequence of frames to be displayed, for example.

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment also includes a primitive setup stage, a rasteriser and a renderer. In an embodiment the renderer is in the form of or includes a programmable fragment shader.

The graphics processing pipeline may also contain any other suitable and desired processing stages that a graphics processing pipeline may contain such as a depth (or depth and stencil) tester, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

The render output to be generated may comprise any render output that is to be generated by the graphics processing pipeline. Thus it may comprise, for example, a tile to be generated in a tile based graphics processing system, and/or a frame of output fragment data. The technology described herein can be used for all forms of output that a graphics processing pipeline may be used to generate, such as frames for display, render-to-texture outputs, etc. In an embodiment, the render output is an output frame.

The technology described herein may be carried out by any kind of graphics processing system. However, in an embodiment, the graphics processing pipeline and system is a tile-based (tiling) graphics processing pipeline and system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

Thus the graphics processing pipeline should (and in an embodiment does) produce some useful output data, e.g. graphics processing output data for use in (subsequent) graphics processing operations etc. In an embodiment, the generated output data is used to provide an image for display, e.g. is provided to a display for display.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to graphics processing in which the vertex shading operation is divided into two stages: a first vertex shading stage (operable to perform a first vertex shading operation) which operates to process (i.e. shade) position (and optionally one or more varyings) data for the vertices included in a draw call; and a second vertex shading stage (operable to perform a second vertex shading operation) which operates to conditionally process (i.e. shade) the remaining varyings data for each vertex included in the draw call. In the present embodiments, a vertex is subjected to the second vertex shading operation if it is determined as being visible using, at least in part, the vertex shaded data from the first vertex shading operation, and the vertex has not already had its remaining varyings data already shaded in the second vertex shading operation.

FIG. 1 schematically illustrates a tile-based graphics processing pipeline 10 according to an embodiment of the technology described herein.

As shown in FIG. 1, the graphics processing pipeline 10 comprises a position shading stage 11, a tiler 12, a varying-only vertex shading stage 13 and a fragment frontend and fragment shader stage 14.

The position shading stage 11 is a vertex shading stage of the graphics processing pipeline 10 that is configured to perform a first vertex shading operation to vertex shade the positional attributes only of the vertices being processed.

As can be seen in FIG. 1, the position shading stage 11 is operable to receive vertices (that is, the data values associated with the original attributes for the vertices) from the application that requires the graphics processing. The position shading stage 11 will then perform vertex shading computations on the positional attributes of those vertices (e.g. by means of some transformation function) to generate partial vertex shaded data (that is, partially shaded vertices where only the positions have been "shaded" (e.g. transformed)).

The position-shaded data, together with a list of the primitives to be processed (which is indicated in terms of the respective indices of the vertices making up each primitive), is then fed to the tiler 12 of the graphics processing pipeline 10.

The tiler 12 uses these two inputs to identify which primitives should be processed for each tile that the render output has been divided into, and prepares a respective primitive list (tile list) for each tile, indicating the primitives that should be processed for that tile. The tiler 12 can sort the primitives into tiles using any desired and suitable technique for that process. (It will be appreciated here that the only vertex shaded data required for the tiler to generate the primitive list(s) is the vertex shaded position data.)

As part of its operation, the tiler 12 will identify primitives that are required to be processed further to generate the render output. This may include, for example, performing view frustum and back-face culling tests on the primitives.

In the present embodiment, the tiler also operates to determine which vertices should be subjected to a second vertex shading operation. The tiler 12 does this by assuming that each vertex that is to be included in a primitive list (i.e. each vertex that has been determined to belong to a visible primitive) should be subjected to a second vertex shading operation.

After it has been determined by the tiler 12 that a vertex (or group of vertices) should be subjected to a second vertex shading operation, the varying only vertex shading stage 13 is triggered to perform vertex shading computations (a second vertex shading operation) on the remaining varying data (attributes) of the vertex (or group of vertices) in question.

In the present embodiments, the varying shading stage 23 is configured to perform vertex shading computations on a vertex or group of vertices on demand, i.e. as and when it is determined that a vertex (or group of vertices) should be subjected to the second vertex shading operation. This will be discussed in more detail below.

It will be appreciated that any vertices that have been subjected to the second vertex shading operation at the varying-only vertex shading stage 13 will now have a complete set of vertex shaded attributes. This data can then be used, together with the tile primitive lists (generated by the tiler 12), to generate the desired output of the graphics processing pipeline, such as a frame for display.

Thus, the vertex shaded positions and varyings data and the primitive lists are passed to the fragment frontend and fragment shader stage 14 of the graphics processing pipeline 10 for subsequent processing.

The fragment frontend and fragment shader stage 14 performs appropriate fragment front-end, rendering (fragment shading), and fragment back-end, processing operations.

The front end operations include primitive (triangle) setup and rasterisation of the primitives.

The rasteriser will receive primitives to be rasterised, test those primitives against sampling point positions, and generate graphics fragments to be rendered representing the primitives accordingly. Each fragment generated by the rasteriser may represent (have associated with it) a single sampling point, or plural sampling points, as desired. In an embodiment, each fragment represents a set of plural, in an embodiment four (2×2), sampling points.

The renderer then processes the fragments generated by the rasteriser to generate rendered fragment data (such as red, green and blue (RGB) colour values and an "Alpha" (transparency) value) for (covered) sampling points that the fragments represent, as is known in the art. These rendering processes may include, for example, fragment shading, blending, texture-mapping, etc. In the present embodiment, the renderer is, as shown in FIG. 1, in the form of a programmable fragment shader.

The rendered fragment data (sampling position data) is then written to a tile buffer and, subsequently, written out as pixel data to a frame buffer, e.g. for display (not shown) (this may include backend fragment operations, such as downsampling, to determine the final pixel colours to be stored in the frame buffer).

It will be appreciated that whilst the first and second vertex shading stages (reference numerals 11 and 13, respectively) are shown as separate stages of the graphics processing pipeline of FIG. 1, in an embodiment the first and second vertex shading operations are performed as respective, different, passes in the same vertex shading execution core.

Furthermore, although FIG. 1 shows the position shading stage 11 before the tiler stage 12 of the graphics processing pipeline 10, this is not required. According to an embodiment of the technology described herein, the tiler 12 is itself configured to trigger the first vertex shading operation as part of its operation. For example, the tiler can be configured to conditionally trigger the first vertex shading operation on a per-vertex (or per-group of vertices) basis. Thus, in an embodiment of the technology described herein, the position shading operation 11 is implemented in parallel with the tiling operation 12 of the graphics processing pipeline 10.

An embodiment of this arrangement will now be described in more detail with respect to FIG. 2.

Figure 2:
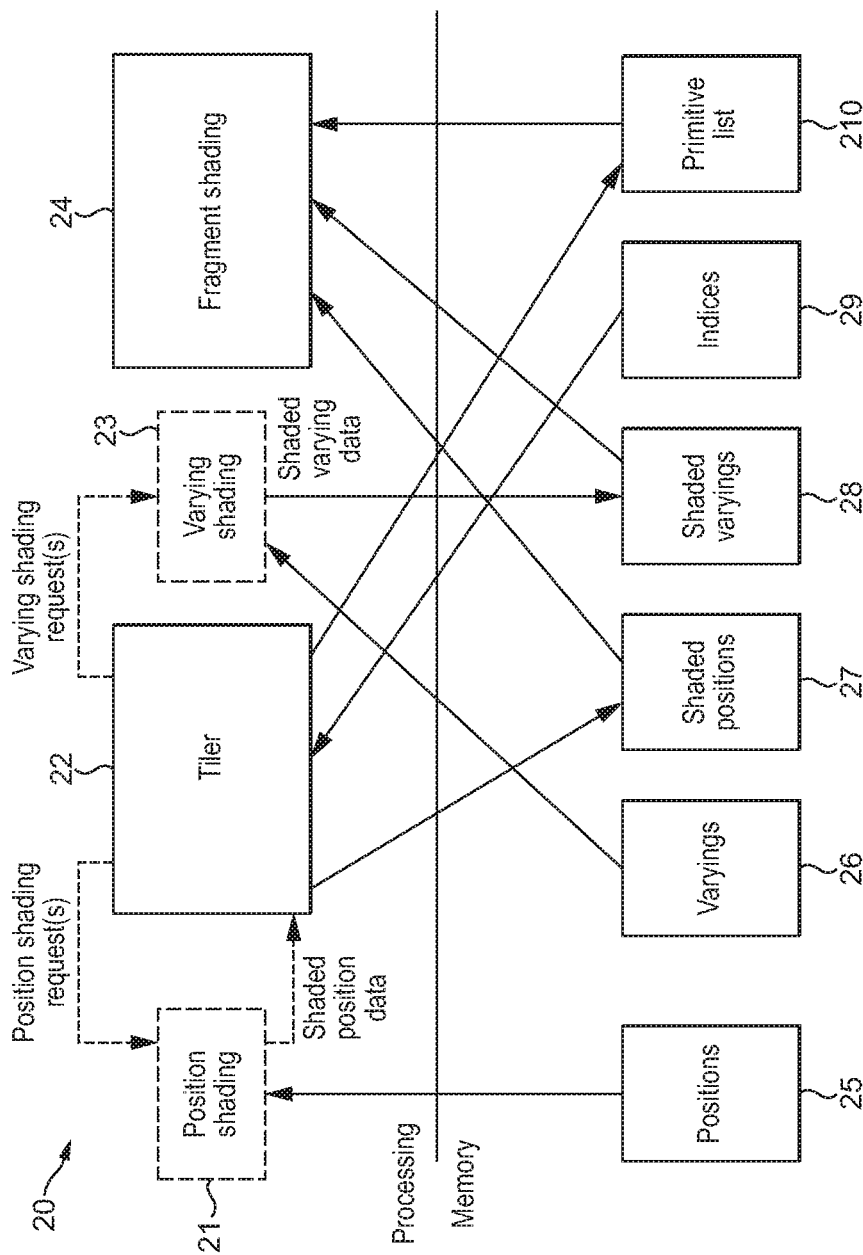
FIG. 2 schematically illustrates the data flow between various stages of a graphics processing pipeline an embodiment of the technology described herein.

FIG. 2 schematically illustrates the data flow between various stages of the graphics processing pipeline 20 according to an embodiment of the technology described herein in which the position shading operation and the varying shading operation are controlled by the tiler 22 as part of the tiler job (task).

FIG. 2 shows the following processing stages of the graphics processing pipeline 20: a position shading stage 21, a tiler 22, a varying-only vertex shading stage 23 and a fragment (frontend and) shading stage 24. The graphics processing pipeline 20 also has access to suitable memory for storing data to be processed or generated by the various processing stages of the graphics processing pipeline 20. In particular, memory is allocated for: raw position data (at memory block 25), raw varyings data (at block 26), vertex-shaded (transformed) position data (at block 27), vertex-shaded (transformed) varyings data (at block 28), index data (at block 29) and primitive list data (at block 210).

The tiler 22 is configured to read a list of indices defining a set of vertices to be processed by the graphics processing pipeline, from memory block 29 (although other sources can be used). The tiler 22 will determine whether or not vertex shading is required for the positional attributes of the vertices. This is done by determining whether or not already transformed position data for the vertices is already stored in memory. If transformed position data is not already stored in memory for a vertex (or group of vertices), this is taken as an indication that vertex shading is required for that vertex (or group of vertices).

If vertex shading is required, the tiler 22 will trigger the vertex shading for the positional attributes of the vertices. This is done by the tiler 22 sending a position shading request for the vertices for the position shading stage 21 (which is implemented in a vertex-shading core (not shown)) of the graphics processing pipeline 20. Thus, the tiler 22 is operable to trigger vertex shading for the positional attributes of the vertices as needed during the tiling operation.

In response to a position shading request for the vertices, the position shading stage 21 will read in the raw position attributes data for the vertices from memory 25. The position shading stage 21 will then perform vertex shading computations on the positional attributes of the vertices (e.g. by means of some transformation function) to generate vertex-shaded data for the position attributes of the vertices. The transformed position data is then sent to the tiler 22, where it can be used further.

The tiler 22 uses the transformed position data and the list of indices to identify which primitives should be processed for each tile that the render output has been divided into, and prepares (and stores in memory 210) a respective primitive list (tile list) for each tile, indicating the primitives that should be processed for that tile. As mentioned above with respect to FIG. 1, the tiler 22 can sort the primitives into tiles using any desired and suitable technique for that process. (It will be appreciated here that the only vertex shaded data required for the tiler 22 to generate the primitive list(s) is the vertex shaded position data.)

As part of its operation, the tiler 22 will also identify primitives that should be processed further to generate the render output. This may include, for example, performing visibility tests on the primitive, such as view frustum and back-face culling tests. Invisible primitives (and their respective vertices) are then culled, whilst the (e.g. at least partially) visible primitives are included in the primitive lists in memory 210.

In the present embodiment, the tiler 22 also operates to determine which vertices should be subjected to the second, varying shading, vertex shading operation 23. The tiler 22 does this by assuming that each vertex that belongs to a primitive that is to be included in a primitive list (i.e. each vertex that has been determined to belong to a (potentially) visible primitive) should be subjected to the second, varying shading, vertex shading operation.

When the tiler 22 determines that a vertex (or group of vertices) should be subjected to the second, varying shading, vertex shading operation 23, the tiler 22 triggers the varying only vertex shading stage 23 to perform vertex shading operations on the remaining varying data (attributes) of the vertex (or group of vertices).

In the present embodiments, the tiler 22 is operable to trigger the varying only vertex shading stage 23 to perform its vertex shading computations on demand, i.e. as and when it is determined that a primitive (to which the vertex or group of vertices belong) is to be included in a primitive list.

This is done by the tiler 22 sending a varying shading request for the vertex (or group of vertices) as soon as it determines that a primitive (to which the vertex or group of vertices belong) is to be included in a primitive list, and in particular, before the tiler 22 proceeds to process another primitive (to determine if that other primitive is to be included in the primitive list).

In response to a varying shading request for the vertex (or group of vertices) from the tiler 22, the varying shading stage 23 reads in the raw varying attributes data for the vertex (or group of vertices) from memory 26. The varyings shading stage 23 then performs vertex shading computations on the varyings attributes of the vertex (or group of vertices) to generate vertex-shaded data for the varyings attributes of the vertex (or group of vertices). The shaded, transformed varyings data is then stored in memory 28, where it can be used later on by the graphics processing pipeline 20.

This process is repeated for each primitive that falls to be considered for the render output in question.

After the varying shading stage 23 has generated vertex-shaded data for the varyings attributes of all of the vertices that should be subjected to the second vertex shading operation, the vertex-shaded data for those vertices (both the transformed position and transformed varyings data) is read by the shader core in the fragment shading stage 24.

In this stage, the shader core renders the framebuffer according to the list of primitives in the primitive list, using the transformed position and varyings data. The fragment shading stage 24 reads the transformed positions and varyings from memory blocks 27 and 28, respectively, for all the vertices included in the primitive lists.

This process can then be repeated for the next render output (e.g. draw call), and so on.

Figure 3:
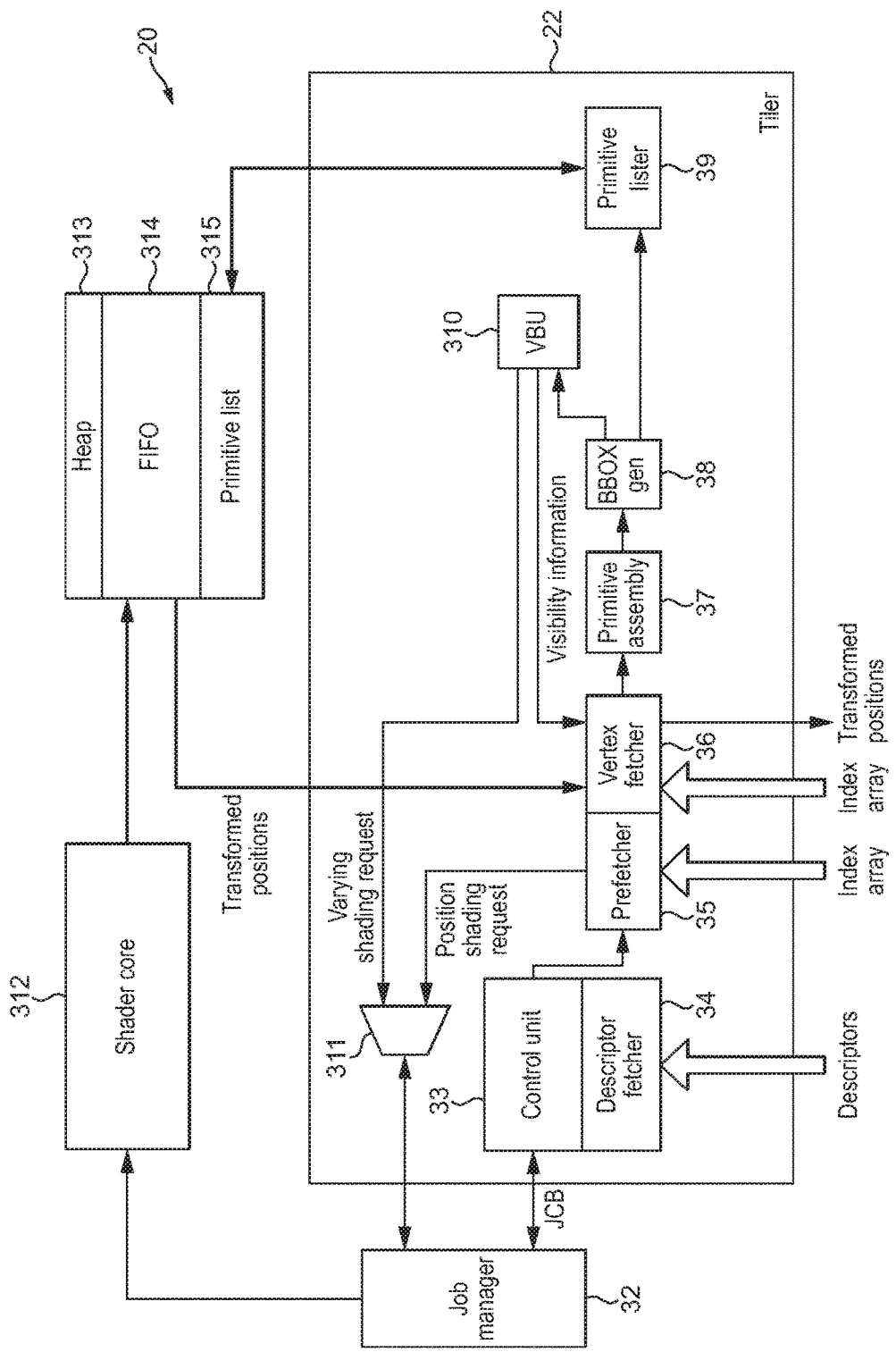
FIG. 3 schematically illustrates operation of the tiler stage of a graphics processing pipeline an embodiment of the technology described herein.

FIG. 3 schematically illustrates in more detail the operation of the tiler 22 of the graphics processing pipeline 20 in embodiments of the technology described herein.

FIG. 3 shows the tiler 31, a job manager 32, a shader core 312 and tiler heap 313 of the graphics processing pipeline 20. Located within the tiler heap 313 is a block of first-in first-out (FIFO) memory 314 which stores vertex shaded position attributes data generated by the shader core 312, and a block of memory 315 for storing a primitive list(s) output from the tiler 22.

In the present embodiment, the FIFO memory 314 is provided as a memory range allocated in main (system) memory. However, this position data is also cached locally for use by the tiler (e.g., and in an embodiment, in an L2 cache) which then acts as an intermediate storage for vertex shaded position attributes generated by the shader core 312 while the tiler needs that information for its operations. In the present embodiments, this vertex cache is located in the vertex fetcher 35, although other arrangements could be used if desired. The cache is configured such that any shaded position data generated by the shader core 312 in response to a request from the tiler should only be evicted from the cache after the tiler has completed its use of that data (and that data has, if appropriate, been written back to the main FIFO memory 314 in main memory).

Other arrangements would, of course, be possible.

To ensure that the necessary position data is available in the cache until any processing that needs that data by the tiler has been completed and the data has, if necessary, been written out to main memory, the need for the relevant position data entries in the cache is in an embodiment tracked. This is in an embodiment done using a reference counting scheme, where the "reference" count is incremented once for every instance of a given vertex, and decremented once each time a value is written out to main memory. Other arrangements would, of course, be possible.

As can be seen in FIG. 3, the tiler 31 comprises a control unit 33, descriptor fetcher 34, vertex prefetcher 35, vertex fetcher 36, primitive assembly stage 37, bounding box generator 38, primitive lister 39, vertex bitmap unit 310 and interface unit 311.

A graphics processing job (task) (e.g. defining a set of draw calls/sub tasks to be processed for a frame or render pass) is received at the control unit 33 of the tiler 31 from the Job Manager 32 via the Job control Bus (JCB). The control unit 33 then instructs the descriptor fetcher 34 to read in the various descriptors needed by the tiler 31 for that graphics processing job. The descriptors provide the information needed by the tiler 31 for the graphics processing job in question, such as the shader program to run (to be executed), the configuration of attributes, stacks, etc., and any other information that is required to run (execute) the shader program.

Once the descriptors have been read in, the tiler 31 causes vertex-shaded position attributes data for the vertices defined for the job in question to be generated. To do this, the control unit 33 instructs the vertex prefetcher 35 to obtain position shaded attributes data for the vertices.

The vertex prefetcher 35 is configured to read in the index array (defining the set of vertices to be processed by the graphics processing pipeline), and determine whether or not vertex shading is required for the positional attributes of the vertices. The vertex prefetcher 35 is configured to do this by checking if vertex shaded position attributes data for the set of vertices is available in the FIFO memory 314.

To facilitate this operation, a set of cache tags identifying the vertex (or group of vertices) for which vertex shaded attributes data is stored in the FIFO memory 314 is maintained for the vertex cache by the vertex fetcher 36.

The vertex prefetcher 35 maintains its own local copy of the FIFO cache tags to track which vertices have vertex shaded position attributes data stored in the FIFO 314 at all times (and updates this using the same replacement (eviction) scheme as the vertex fetcher 36). This then allows the vertex prefetcher 35 to, in effect, (correctly) predict the cache content.

The vertex prefetcher 35 determines, for each vertex (or groups of vertices) of the set of vertices to be processed, whether or not an identifier of the vertex (or group of vertices) is the same as a local cache tag for vertices stored in the FIFO memory 314.

If the determination reveals a "cache miss", i.e. the determination reveals that vertex shaded position attributes data is not stored in the FIFO memory 314 (i.e. in the cache) for the vertex (or group of vertices), this is taken as an indication that vertex shading is required (with respect to the positional attributes) for that vertex (or group of vertices).

Accordingly, the vertex prefetcher 35 will trigger the vertex shading operation to generate vertex shaded position attributes data for all vertices that correspond to a cache miss. This is done by the prefetcher 35 sending a position shading request for a vertex (or group of vertices) to the Job Manager 32 via the interface 311. The job manager 32 instructs an available shader core 312 to perform the relevant vertex shading operation. At this point, the prefetcher 35 also indicates to the vertex fetcher 36 that vertex shaded position attributes data is not available in memory.

The position shading request contains an indication that it is a "position shading request" and information including job ID, index ID, instance ID, request ID and base address. The job ID is used to identify the descriptors related to the job. The index ID and instance ID is used to identify the vertex within that job. The base address and the request ID (offset from base address) defines the address in the memory 314 at which the output (shaded positions) from the shader core 312 should be stored. The address will define the next entry in the FIFO memory 314.

After the shader core 312 has generated the vertex shaded position data for a vertex (or group of vertices), the vertex shaded position data is stored in the next entry in the FIFO memory 314. The local cache tags on the prefetcher 35 are also updated at this point.

The shader core 312 then sends a notification to the prefetcher 35 via the job manager 32 to indicate that the next entry is valid, i.e. that the vertex shaded position attributes data for the vertex (or group of vertices) has been stored for the next FIFO entry. The prefetcher 35 then notifies the vertex fetcher 36 that vertex shaded position attributes data is now available in memory 314 for that vertex (or group of vertices).

If the determination as to whether or not a cache tag is stored for the vertex (or group of vertices) in question reveals a "cache hit", i.e. vertex shaded position attributes data is already stored in the FIFO memory 314 for the vertex (or group of vertices), then the position vertex shading operation is not required (and is not performed) for that vertex (or group of vertices). In this case, the prefetcher 35 will indicate to the vertex fetcher 36 that vertex shaded position attributes data is available in memory.

The vertex fetcher 36 is operable to receive and process the index array concurrently with the prefetcher 35. Thus, the vertex fetcher 26 will process a vertex (or group of vertices) defined by the index array one-by-one with the prefetcher 35.

For a given vertex (or group of vertices) being processed by the prefetcher 35 and vertex fetcher 36, the vertex fetcher 36 will receive a notification from the prefetcher 35 as to whether or not vertex shaded attributes data is available in the FIFO memory for the vertex (or group) in question.

Where the vertex fetcher 36 receives a notification (from the vertex fetcher 36) that vertex shaded position attributes data for a vertex (or group of vertices) is available in memory (i.e. the vertex (or group of vertices) corresponds to a cache hit), it will proceed to retrieve that data from the FIFO memory 314 and load it into the corresponding, local, vertex cache.

Where the vertex fetcher 36 receives a notification (from the vertex fetcher 36) that vertex shaded position attributes data for a vertex (or group of vertices) is not available in memory (i.e. the vertex (or group of vertices) corresponds to a cache miss), the vertex fetcher 36 will wait for the prefetcher 35 to signal that the next entry in the FIFO is valid, and then read that next entry in the FIFO where the vertex shaded position attributes data for the vertex (or group of vertices) will then be stored.

In both cases, the vertex fetcher 36 will then send the vertex shaded position attributes data for the vertices (together with the index array defining the primitives to be processed) to the primitive assembly unit 37, where the primitives are built for further processing.

After the primitives have been built in the primitive assembly unit 37, the primitives are sent to the bounding box generator unit 38.

The bounding box generator unit 38 is operable to determine the visibility of the primitives and store a "visibility flag" in association with each primitive. This is done by generating, for each primitive, a bounding box covering the primitive in question. Each bounding box is then tested by, for example, performing backface culling, frustum and viewport culling, scissoring, and/or sample aware tiling tests on the bounding boxes.

When a primitive is marked as visible (by the visibility flag), the primitive is then sent to the primitive lister 39 and sorted into respective primitive lists for each tile that the render output has been divided into. The polygon lists are then written in memory 315, for use later on in the graphics processing pipeline. The memory 315 for each primitive list is allocated as fixed sized chunks from the heap 313 as needed.

After a primitive is processed at the bounding box generator 38, it is passed to the vertex bitmap unit 310, which maintains a vertex bitmap (not shown). Each entry (bit) in the vertex bitmap indicates whether the remaining (non-position) varyings of a vertex associated with that entry has previously been subjected to the varying shading operation.

When the VBU 310 receives a primitive, it will check whether the primitive is flagged as visible. If the primitive is not visible, the primitive will be discarded from further processing. However, if the primitive is visible, the VBU 310 will, for every vertex in the primitive, check the vertex bitmap to see if varying shading has already been performed for the vertex.

If the vertex bitmap indicates that varying shading has not been previously done for a vertex (or if none of the entries in the bitmap correspond to the vertex in question), the VBU 310 will send a varying shading request for that vertex to the job manager 32 and set the entry in the bitmap corresponding to the vertex to a value indicating that varying shading has been done (or if none of the entries in the bitmap correspond to the vertex in question, allocate a new entry in the bitmap to the vertex and set that entry to a value indicating that varying shading has been done for that vertex). (To avoid lots of partial writes and too many shading requests to the shader core, in the present embodiments the tiler requests shading (both position and varying) for groups of plural, e.g. four, vertices.)

The varying shading request contains an indication that it is a "varying shading" request and the same information as the position shading request mentioned above. Thus, when vertex shaded varying attributes data is generated, the data is written to the correct location in memory. The job manager 32 will send a response to the tiler 31 to state that the vertex shaded varying attributes data is available in the FIFO 314.

When the varying shading request has been sent from the VBU 310, the VBU 310 will pass the primitive to the next stage in the pipeline, such as a fragment shading stage (not shown). For synchronization purposes between tiler jobs and fragment jobs, the progress of the varying shading is tracked. This can be done, e.g., by either stalling completion of the tiler job until the tiler 31 has received responses for all requests or by tracking this in the job manager 32.

In addition to the above, the VBU 310 is also operable to notify the vertex fetcher 36 about visible vertices, so that the vertex fetcher 36 will then store (write out) the vertex shaded position data for the visible primitives in the vertex cache to the FIFO memory 314 in main (system) memory. After the vertex shaded position data for the visible primitives has been stored in system memory, the data can be evicted from the vertex cache.

It can be seen from the above that the technology described herein, in embodiments at least, provides a system that, inter alia, generates a full set of vertex shaded attributes (required for generating a frame for display, for example) only for vertices that it is determined should be subjected to a second vertex shading operation, e.g. because they will be required to generate the output, e.g. frame for display. The technology described herein can also allow "raw" vertex data which has already been read in and stored in local memory (for use during the first vertex shading operation) to be used for the second vertex shading operation without having to read in the data from memory for a second time.

This is achieved in the embodiments of the technology described herein at least, by dividing the vertex shading operation into two stages (two passes): a first stage (pass) that performs vertex shading computations on some but not all of attributes of a vertex; and a second stage (pass), which is triggered soon after the first stage has finished for the vertex (by sending a request for the second stage to be performed when it is determined that the vertex has been determined should be processed in the second stage), wherein the second stage performs vertex shading computations on other attributes of the vertex.

Such a system is advantageous in that it, inter alia, reduces redundant vertex shading computations, such as those that are performed on vertices that will not be visible in the scene to be rendered for display, and reduces the number of read operations when fetching "raw" vertex data from memory, thereby improving the overall performance of the graphics processing system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing pipeline, the method comprising:
for a set of vertices to be processed by the graphics processing pipeline:
vertex shading circuitry of the graphics processing pipeline performing a first vertex shading operation for one or more vertices of the set of vertices, to generate vertex shaded attribute data for at least one but not all of a plurality of vertex attributes of the one or more vertices of the set;
testing circuitry of the graphics processing pipeline determining, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;
the testing circuitry, in response to determining that a second vertex shading operation should be performed for a vertex or group of vertices, sending a request for a second vertex shading operation to be performed for a group of plural vertices, wherein the request is sent before it is determined if another vertex or group of vertices in the set that has been subjected to the first vertex shading operation should be subjected to the second vertex shading operation;
in response to the request from the testing circuitry, vertex shading circuitry of the graphics processing pipeline performing a second vertex shading operation for the group of plural vertices for which the request has been sent, to generate vertex shaded attribute data for the at least one other vertex attribute of the plurality of vertex attributes of the one or more vertices of the set; and
storing information indicating vertices and/or groups of vertices that have been subjected to the second vertex shading operation;
wherein the testing circuitry determining whether or not a second vertex shading operation to generate vertex shaded attribute data for at least one other vertex attribute of the plurality of vertex attributes of the one or more vertices of the set should be performed for the vertex or group of vertices further comprises:
determining from the information indicating vertices and/or groups of vertices that have already been subjected to the second vertex shading operation, whether the vertex or group of vertices has already been subjected to the second vertex shading operation; and
when it is determined from the information that the vertex or group of vertices has already been subjected to the second vertex shading operation, then not sending the request for the group of plural vertices to be subjected to the second vertex shading operation;
but when it is not determined that the vertex or group of vertices has already been subjected to the second vertex shading operation from the information, sending the request for the group of plural vertices to be subjected to the second vertex shading operation.

2. The method of claim 1, wherein:
the request for the second vertex shading operation to be performed comprises an indicator that identifies it as being a request for the second vertex shading operation and information needed by the graphics processing pipeline to be able to carry out the second vertex shading operation.

3. The method of claim 1, wherein:
the request for the second vertex shading operation is sent to processing circuitry of the graphics processing pipeline that manages one or more processes of the graphics processing pipeline.

4. The method of claim 1, comprising:
storing information indicating which vertices or groups of vertices have previously been subjected to the second vertex shading operation for up to a particular maximum number of vertices or groups of vertices only.

5. The method of claim 1, wherein:
the step of determining from information indicating vertices and/or groups of vertices that have already been subjected to the second vertex shading operation, whether a vertex or group of vertices has already been subjected to the second vertex shading operation comprises:
first determining whether information indicating whether the vertex or group of vertices has previously been subjected to the second vertex shading operation could be stored for the vertex or group of vertices.

6. The method of claim 1, further comprising:
the testing circuitry determining for a vertex or group of vertices, whether or not the first vertex shading operation to generate vertex shaded attribute data for at least one but not all of a plurality of vertex attributes of the one or more vertices of the set should be performed for the vertex or group of vertices;

and, in response to determining that the first vertex shading operation should be performed for a vertex or group of vertices:

sending a request for the first vertex shading operation to be performed for the vertex or group of vertices.

7. The method of claim 1, wherein the graphics processing pipeline is a tile based graphics processing pipeline, and the tiling circuitry of the graphics processing pipeline operates as the testing circuitry.

8. A graphics processing pipeline, comprising:

vertex shading circuitry configured to perform a first vertex shading operation for one or more vertices of a set of vertices to be processed by the graphics processing pipeline, to generate vertex shaded attribute data for at least one but not all of a plurality of vertex attributes of the one or more vertices of the set;

testing circuitry configured to determine, for respective vertices or groups of vertices that have been subjected to the first vertex shading operation, whether or not a second vertex shading operation to generate vertex shaded attribute data for at least one other vertex attribute of the plurality of vertex attributes of the one or more vertices should be performed for the vertex or group of vertices, wherein the determination comprises using, at least in part, some or all of the vertex shaded attribute data generated by the first vertex shading operation;

the testing circuitry being further configured to, in response to determining that a second vertex shading operation should be performed for a vertex or group of vertices, send a request for a second vertex shading operation to be performed for a group of plural vertices, wherein the testing circuitry is configured to send the request before it is determined if another vertex or group of vertices in the set that has been subjected to the first vertex shading operation should be subjected to the second vertex shading operation; and processing circuitry configured to, in response to the request from the testing circuitry:

perform a second vertex shading operation for the group of plural vertices for which the request has been sent, to generate vertex shaded attribute data for the at least one other vertex attribute of the plurality of vertex attributes of the one or more vertices of the set;

the processing circuitry being further configured to store information indicating vertices and/or groups of vertices that have been subjected to the second vertex shading operation;

wherein the testing circuitry is further configured to determine whether or not a second vertex shading operation to generate vertex shaded attribute data for at least one other vertex attribute of the plurality of vertex attributes of the one or more vertices of the set should be performed for the vertex or group of vertices by:

determining from the information indicating vertices and/or groups of vertices that have already been subjected to the second vertex shading operation, whether the vertex or group of vertices has already been subjected to the second vertex shading operation; and when it is determined from the information that the vertex or group of vertices has already been subjected to the second vertex shading operation, then not send the request for the group of plural vertices to be subjected to the second vertex shading operation;

but when it is not determined that the vertex or group of vertices has already been subjected to the second vertex shading operation from the information, send the request for the group of plural vertices to be subjected to the second vertex shading operation.

9. The pipeline of claim 8, wherein:

the request for the second vertex shading operation to be performed comprises an indicator that identifies it as being a request for the second vertex shading operation and information needed by the processing circuitry of the graphics processing pipeline to be able to carry out the second vertex shading operation.

10. The pipeline of claim 8, wherein:

the request for the second vertex shading operation is sent to processing circuitry of the graphics processing pipeline that manages one or more processes of the graphics processing pipeline.

11. The pipeline of claim 8, wherein processing circuitry of the pipeline is configured to:

store information indicating which vertices or groups of vertices have previously been subjected to the second vertex shading operation for up to a particular maximum number of vertices or groups of vertices only.

12. The pipeline of claim 8, wherein the testing circuitry is configured to determine from information indicating vertices and/or groups of vertices that have already been subjected to the second vertex shading operation, whether a vertex or group of vertices has already been subjected to the second vertex shading operation by:

first determining whether information indicating whether the vertex or group of vertices has previously been subjected to the second vertex shading operation could be stored for the vertex or group of vertices.

13. The pipeline of claim 8, wherein the testing circuitry is further configured to:

determine for a vertex or group of vertices, whether or not the first vertex shading operation to generate vertex shaded attribute data for at least one but not all of a plurality of vertex attributes of the one or more vertices of the set should be performed for the vertex or group of vertices;

and to, in response to determining that the first vertex shading operation should be performed for a vertex or group of vertices:

send a request for the first vertex shading operation to be performed for the vertex or group of vertices.

14. The pipeline of claim 8, wherein the graphics processing pipeline is a tile based graphics processing pipeline, and tiling circuitry of the graphics processing pipeline operates as the testing circuitry.

15. A non-transitory computer readable storage medium storing computer software code which when executed on at least one processor performs a method of operating a graphics processing pipeline, the method comprising:

for a set of vertices to be processed by the graphics processing pipeline:

vertex shading circuitry of the graphics processing pipeline performing a first vertex shading operation for one or more vertices of the set of vertices, to generate vertex shaded attribute data for at least one but not all of a plurality of vertex attributes of the one or more vertices of the set;

testing circuitry of the graphics processing pipeline determining, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;

the testing circuitry, in response to determining that a second vertex shading operation should be performed for a vertex or group of vertices, sending a request for a second vertex shading operation to be performed for a group of plural vertices, wherein the request is sent before it is determined if another vertex or group of vertices in the set that has been subjected to the first vertex shading operation should be subjected to the second vertex shading operation;

in response to the request from the testing circuitry, vertex shading circuitry of the graphics processing pipeline performing a second vertex shading operation for the group of plural vertices for which the request has been sent, to generate vertex shaded attribute data for the at least one other vertex attribute of the plurality of vertex attributes of the one or more vertices of the set; and storing information indicating vertices and/or groups of vertices that have been subjected to the second vertex shading operation;

wherein the testing circuitry determining whether or not a second vertex shading operation to generate vertex shaded attribute data for at least one other vertex attribute of the plurality of vertex attributes of the one or more vertices of the set should be performed for the vertex or group of vertices further comprises:

determining from information indicating vertices and/or groups of vertices that have already been subjected to the second vertex shading operation, whether a vertex or group of vertices has already been subjected to the second vertex shading operation; and when it is determined from the information that the vertex or group of vertices has already been subjected to the second vertex shading operation, then not sending the request for the group of plural vertices to be subjected to the second vertex shading operation;

but when it is not determined that the vertex or group of vertices has already been subjected to the second vertex shading operation from the information, sending the request for the group of plural vertices to be subjected to the second vertex shading operation.

* * * * *